United States Patent
Diao et al.

(10) Patent No.: US 10,640,210 B2
(45) Date of Patent: May 5, 2020

(54) METHOD AND APPARATUS FOR CABLE-DRIVEN ADAPTIVE VIBRATION CONTROL

(71) Applicant: Purdue Research Foundation, West Lafayette, IN (US)

(72) Inventors: Xiumin Diao, West Lafayette, IN (US); Hao Xiong, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 14 days.

(21) Appl. No.: 16/100,253

(22) Filed: Aug. 10, 2018

(65) Prior Publication Data

US 2019/0047705 A1    Feb. 14, 2019

Related U.S. Application Data

(60) Provisional application No. 62/544,414, filed on Aug. 11, 2017.

(51) Int. Cl.
*B64C 39/02* (2006.01)
*G05D 1/08* (2006.01)
*B64C 27/00* (2006.01)

(52) U.S. Cl.
CPC .......... *B64C 39/024* (2013.01); *B64C 27/001* (2013.01); *B64C 39/022* (2013.01);
(Continued)

(58) Field of Classification Search
CPC ... B64C 39/024; B64C 27/001; B64C 39/022; B64C 2027/004; B64C 2201/027;
(Continued)

(56) References Cited

U.S. PATENT DOCUMENTS

| | | | |
|---|---|---|---|
| 6,029,959 A * | 2/2000 | Gran | F16F 15/005 188/378 |
| 2006/0175169 A1* | 8/2006 | Or | F16F 7/1005 188/379 |

(Continued)

FOREIGN PATENT DOCUMENTS

CN    102991678    3/2013

OTHER PUBLICATIONS

Khosravi et al., "Robust PID control of fully-constrained cable driven parallel robots" Mechatronics 24 (2014) 87-97 (Year: 2014).*

(Continued)

*Primary Examiner* — Yazan A Soofi
*Assistant Examiner* — Naeem Taslim Alam
(74) *Attorney, Agent, or Firm* — Piroozi-IP, LLC

(57) ABSTRACT

A vibration control system for an unmanned aerial vehicle (UAV) is disclosed. The system includes a base platform fixedly coupled to a UAV structure, a working platform coupled to the base platform by two or more cables at two or more connection points on the working platform, and two or more actuators positioned either on the base platform or the working platform, each actuator configured to receive a signal to adjust tension in a corresponding cable, wherein by adjusting tension in the two or more cables, natural frequency of the working platform can be adjusted in response to frequency of vibration experienced by the working platform in order to maintain a frequency ratio (FR) of the vibration frequency to the natural frequency at or above a predetermined value.

14 Claims, 17 Drawing Sheets

(52) U.S. Cl.
CPC ............ *G05D 1/085* (2013.01); *G05D 1/0816* (2013.01); *G05D 1/0825* (2013.01); *B64C 2027/004* (2013.01); *B64C 2201/027* (2013.01); *B64C 2201/042* (2013.01); *B64C 2201/127* (2013.01); *B64C 2201/146* (2013.01)

(58) Field of Classification Search
CPC ........ B64C 2201/042; B64C 2201/127; B64C 2201/146; G05D 1/0825; G05D 1/085
USPC ............................................................ 701/4
See application file for complete search history.

(56) References Cited

U.S. PATENT DOCUMENTS

| | | | |
|---|---|---|---|
| 2015/0217975 A1* | 8/2015 | Khajepour | B25J 9/0078 254/292 |
| 2017/0037928 A1* | 2/2017 | Kronkright | F16F 7/01 |

OTHER PUBLICATIONS

Khosravi et al., "Dynamic Modeling and Control of Parallel Robots With Elastic Cables: Singular Perturbation Approach" IEEE Transactions on Robotics, vol. 30, No. 3, Jun. 2014 (Year: 2014).*

Jamshidifar et al., "Kinematically-Constrained Redundant Cable-Driven Parallel Robots: Modeling, Redundancy Analysis, and Stiffness Optimization," IEEE/ASME Trans. Mechatronics, Apr. 2017, pp. 921-930, vol. 22, No. 2.

Azadi et al., "Antagonistic variable stiffness elements," Mech. Mach. Theory, 2009, pp. 1746-1758, vol. 44, No. 9.

Behzadipour et al., "Stiffness of Cable-based Parallel Manipulators With Application to Stability Analysis," J. Mech. Des., 2006, p. 303, vol. 128, No. 1.

Behzadipour et al., "Antagonistic stiffness in cable-driven mechanisms," in IFToMM World Congress, Besançon, France, In, 2007.

Diao et al., "Force-Closure Analysis of General 6-DOF Cable Manipulators," Proceedings of the 2007 IEEE/RSJ International, Conference on Intelligent Robots and Systems, 2007, pp. 3931-3936.

Diao et al., "Vibration analysis of cable-driven parallel manipulators," 2009, pp. 347-360, Multibody Syst. Dyn., vol. 21, No. 4.

Khosravi et al., "Dynamic analysis and control of cable driven robots with elastic cables," Trans. Can. Soc. Mech. Eng., 2011, pp. 543-558, vol. 35, No. 4.

Khosravi et al., "Robust PID control of fully-constrained cable driven parallel robots," Mechatronics, 2014, pp. 87-97, vol. 24, No. 2.

Khosravi et al., "Dynamic Modeling and Control of Parallel Robots With Elastic Cables☐: Singular Perturbation Approach," Ieee Trans. Robot., 2014, pp. 1-11, vol. 30, No. 3.

Weber et al., "Active vibration canceling of a cable-driven parallel robot in modal space," Robot. Autom. (ICRA), 2015 IEEE Int. Conf., 2015 , pp. 1599-1604, No. 2.

* cited by examiner

METHOD AND APPARATUS FOR CABLE-DRIVEN ADAPTIVE VIBRATION CONTROL

CROSS-REFERENCE TO RELATED APPLICATIONS

The present patent application is related to and claims the priority benefit of U.S. Provisional Patent Application Ser. No. 62/544,414, filed Aug. 11, 2017, the contents of which is hereby incorporated by reference in its entirety into the present disclosure.

TECHNICAL FIELD

The present disclosure generally relates to vibration control and in particular to active and adaptive vibration control.

BACKGROUND

This section introduces aspects that may help facilitate a better understanding of the disclosure. Accordingly, these statements are to be read in this light and are not to be understood as admissions about what is or is not prior art.

Vibration control is an important aspect of vehicles and machinery. Uncontrolled vibration can result in unwanted wear and excessive noise in sensor data. In recent years, unmanned aerial vehicles (UAVs) have been increasingly used for information gathering, such as reconnaissance, surveillance, and target tracking, for both military and civil purposes. To acquire information, UAVs are generally equipped with various sophisticated sensors and instruments such as high-resolution imaging sensors, accelerometers, compasses, and gyros.

UAVs have lightweight, lightly damped, and flexible structures characterized by closely spaced vibration modes and low natural frequencies (usually just a few Hz). They also suffer from high-frequency vibrations due to the rotation of propellers and air friction. Vibration has been an important concern for onboard sensors and instruments fixed directly to the aerial vehicle chassis. Undesired vibration disturbances can severely degrade their performances. To minimize vibration disturbances to sensors and instruments on UAVs, an efficient vibration control method is needed. The currently existing vibration control methods can be commonly classified as either passive or active methods.

Passive vibration control methods usually use viscoelastic dampers, springs, shock absorbers, or structures with certain compliances to suppress undesired vibration disturbances. In one such approach, the vibration isolation device is essentially a rigid-link parallel manipulator with a damper mounted between rigid legs and the base platform. Passive approaches are relatively simple and straightforward in structure and thus, are inexpensive for construction and maintenance. However, passive vibration control methods are generally inefficient to control low frequency vibrations on UAVs. In addition, passive vibration control methods are normally designed to control a certain type of vibration with a specific frequency range. They are not adaptive to a dynamic vibration environment with low frequency vibrations as well as high frequency vibrations.

Unlike passive systems, active vibration control systems utilize sophisticated methods with active vibration control strategies. For example, one existing vibration control system for robotic arms incorporates active feedback control for actuators of a robotic arm to compensate the robotic arm's vibration. Another example is a vibration control system that controls the vibration of a payload moving by a robotic arm. The tension in a cable along with the robotic arm is actively controlled through a motor such that the vibration of a payload can be properly compensated.

While existing active vibration control systems and methods are more efficient in handling various vibrational disturbances by being able to control both low and high frequency vibrations, these systems are expensive, complex in both hardware and software, and are relatively heavy, which makes them inappropriate to be applied on UAVs with limited take-off weight.

Therefore, there is an unmet need for a novel approach to actively and adaptively control vibration on UAVs.

SUMMARY

A vibration control system for an unmanned aerial vehicle (UAV) is disclosed. The system includes a base platform that is fixedly coupled to a UAV structure. The system also includes a working platform that is coupled to the base platform by two or more cables at two or more connection points on the working platform. Furthermore, the system includes two or more actuators positioned either on the base platform or the working platform, where each actuator is configured to receive a signal to adjust tension in a corresponding cable, wherein by adjusting tension in the two or more cables, natural frequency of the working platform can be adjusted in response to frequency of vibration experienced by the working platform in order to maintain a frequency ratio (FR) of the vibration frequency to the natural frequency at or above a predetermined value.

A vibration control drive system used in an unmanned aerial vehicle (UAV) is also disclosed. The drive system includes a base platform fixedly coupled to a UAV structure. The system also includes a working platform that is coupled to the base platform by two or more cables at two or more connection points on the working platform. The system further includes two or more actuators that are positioned either on the base platform or the working platform, where each actuator is configured to receive a signal to adjust tension in a corresponding cable. Furthermore, the system includes a first controller coupled to and adapted to control the two or more actuators, whereby two or more control signals are calculated for the two or more actuators based on a target position from a current position of the working platform according to one of (i) an open-loop configuration, (ii) a first closed-loop configuration utilizing velocity of the working platform as a feedback signal, or (iii) a second closed-loop configuration utilizing velocity of the working platform as a first feedback signal and the position information of the working platform as a second feedback signal.

BRIEF DESCRIPTION OF DRAWINGS

FIG. 2I is a graph of velocity in y direction vs. time for the system shown in FIG. 2D following a figure-8 trajectory for cables having a first elasticity.

DETAILED DESCRIPTION

Figure 1:
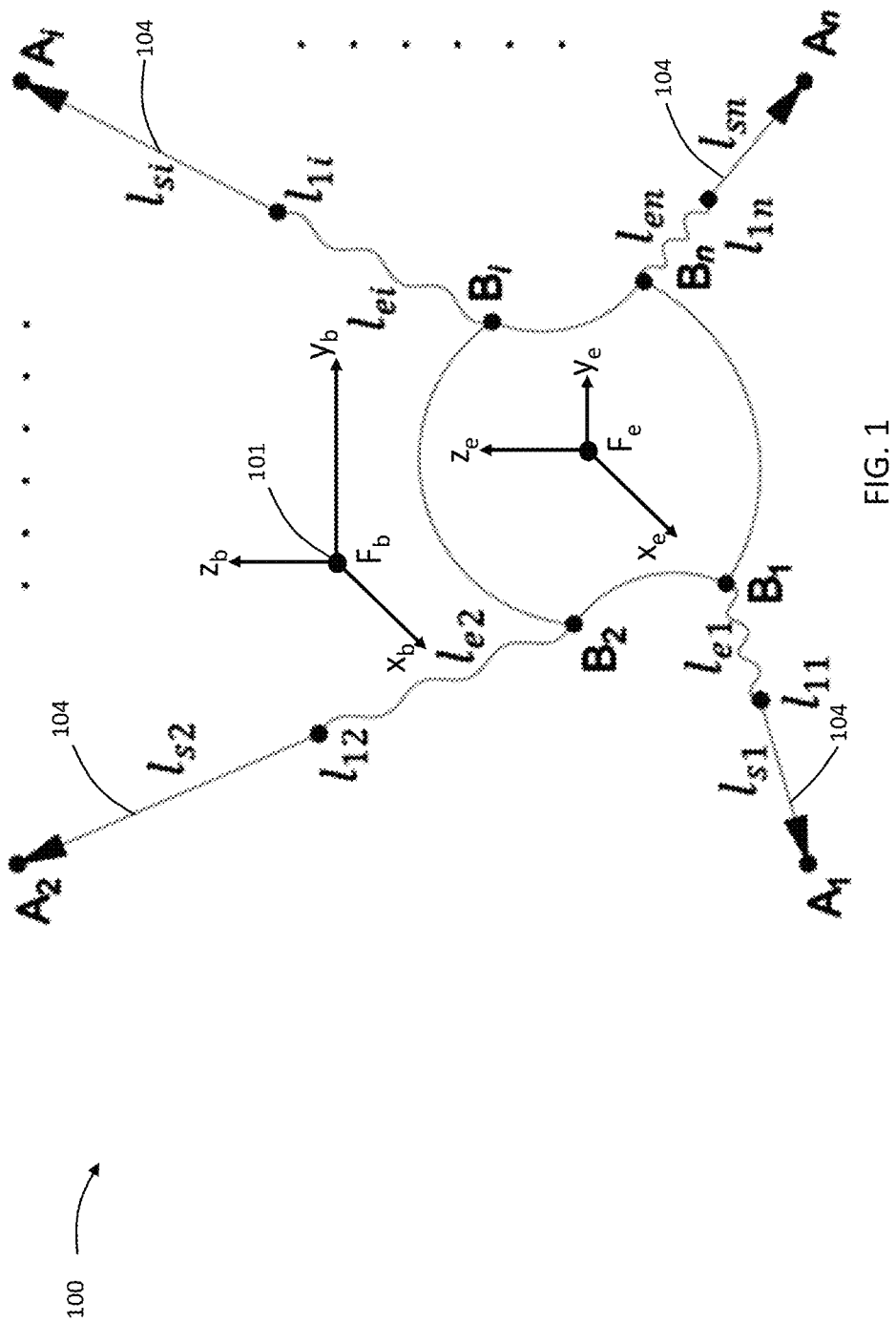
FIG. 1 is a schematic of a working platform coupled to a base platform attached to an unmanned aerial vehicle (UAV), depicting vectors defining connections between the working platform and the base platform.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel approach to actively and adaptively control vibration on unmanned aerial vehicles (UAVs) is disclosed. Referring to FIG. 1, a schematic of a cable driven parallel manipulator (CDPM) vibration control system 100 is depicted. In one embodiment, the system 100 shown in FIG. 1 is implemented in a UAV. The system 100 includes a base platform 101—designated in FIG. 1 as $F_b$ with an accompanying Cartesian coordinate system $X_b$, $Y_b$, and $Z_b$, a working platform (also referred to as an end effector)—designated in FIG. 1 as $F_e$ with an accompanying Cartesian coordinate system $X_e$, $Y_e$, and $Z_e$. The base platform 101 is rigidly mounted to a structure (e.g., body of a UAV (not shown)) and receives undesired vibration therefrom. In the UAV embodiment, the body of the UAV (not shown) itself can also work as the base platform 101. The working platform ($F_e$) is coupled to the base platform 101 by a set of cables extended between anchor points identified in FIG. 1 as $A_1, A_2, \ldots A_i, \ldots$ and $A_n$ provided on the base platform 101 and anchor points identified in FIG. 1 as $B_1, B_2, \ldots B_i, \ldots$ and $B_n$ provided on the working platform 101. Each anchor point ($A_1, A_2, \ldots A_i, \ldots$ and $A_n$ and $B_1, B_2, \ldots B_i, \ldots$ and $B_n$) may represent winches, motors, pulleys, and other cable-related mechanical components known to a person having ordinary skill in the art, which are widely used on CDPMs. The positions of the two attaching points $A_i$ and $B_i$ are represented by vectors $a_i$ and $b_i$, respectively. $u_i$ is the unit vector along the $i^{th}$ cable. Generally, for an n-DoF system 100, it requires at least n+1 cables 104 corresponding anchor points. In order to simplify the modeling of a cable stretched by a pulley, each of the cables 104 is virtually divided into two parts. The first part is inelastic, as shown by $l_{s1}, l_{s2}, \ldots l_{si}, \ldots$ and $l_{sn}$. The inelastic part of the cables 104 (i.e., $l_{s1}, l_{s2}, \ldots l_{si}, \ldots$ and $l_{sn}$) can be wound or unwound around pulleys. The second part is elastic, as shown in FIG. 1 as $l_{e1}, l_{e2}, \ldots l_{ei}, \ldots$ and $l_{en}$. The two parts (elastic and inelastic) are connected in series to represent the cable 104. Therefore, the resultant stiffness of the combined elastic and inelastic parts of the cable 104 is determined by the stiffness of the elastic part (i.e., $l_{e1}, l_{e2}, \ldots l_{ei}, \ldots$ and $l_{en}$). Thus each cable 104 in FIG. 1 is identified as $l_{1i}$ (where i=1, 2, ... n) which represents the length of the $i^{th}$ cable between the anchor point $B_i$ on the end-effector (i.e., working platform $F_e$) and the anchor point $A_i$ on the base platform 101. Therefore, as discussed above, $l_{si}$ (i=1, 2, ..., n) denotes the length of the unwound inelastic part of the $i^{th}$ cable. $l_{si}$ can be obtained by measuring the rotation of the pulley (i.e., how many revolutions the pully or the motor has rotated and the circumference of the outer surface of the pully or the motor). Similarly, $l_{ei}$ (i=1, 2, ..., n) denotes the free length (i.e., the length when there is zero tension) of the elastic part of the $i^{th}$ cable, which is a constant. In order to develop a solution for system 100, the cables 104 are described in matrix operation as provided below:

$$l_1 = [l_{11}\ l_{12}\ \ldots\ l_{1n}]^T \quad (1)$$

$$l_s = [l_{s1}\ l_{s2}\ \ldots\ l_{sn}]^T \quad (2)$$

$$l_e = [l_{e1}\ l_{e2}\ \ldots\ l_{en}]^T \quad (3)$$

As discussed above, $l_e$ is a constant vector. With these parameters defined, the extended lengths of the cable $\Delta l_e$ can be defined as:

$$\Delta l_e = l_1 - l_s - l_e \quad (4)$$

The cable tension can be expressed by a vector $\tau$.

$$\tau = K \Delta l_e \quad (5)$$

$$\text{where } \tau = [\tau_1\ \tau_2\ \ldots\ \tau_n]^T \quad (6)$$

is the tension in the cables 104, and
K is the stiffness matrix of the cables 104. Assuming all cables 104 have the same Young's modulus of elasticity E and the same cross-sectional area A, then the stiffness matrix K can be expressed as $$K = EA \cdot \text{diag}^{-1}(l_e) \quad (7)$$

where $\text{diag}^{-1}(l_e)$ is $$\text{diag}^{-1}(l_e) = \begin{bmatrix} \frac{1}{l_{e1}} & 0 & 0 & 0 \\ 0 & \frac{1}{l_{e2}} & 0 & 0 \\ 0 & 0 & \ddots & 0 \\ 0 & 0 & 0 & \frac{1}{l_{en}} \end{bmatrix} \quad (8)$$

Substituting (7) into (5) provides:

$$\tau = EA \cdot \text{diag}^{-1}(l_e)\Delta l_e \quad (9)$$

With the tension matrix determined, a derivation of the kinematics is now provided. Let x, ẋ, and ẍ be the pose vector, the velocity vector, and the acceleration vector of the working platform (or end effector) $F_e$, respectively. The equation of motion of the system 100 can then be expressed as:

$$M\ddot{x} + C\dot{x} + G = -J^T\tau \quad (10)$$

where M is the inertia matrix,
C is the Coriolis and centripetal matrix,
G is the gravity vector, and
J is the Jacobian matrix of the system 100. For a CDPM (e.g., system 100), $$J = -\begin{bmatrix} u_1 & u_2 & \cdots & u_n \\ b_1 \times u_1 & b_2 \times u_2 & \cdots & b_n \times u_n \end{bmatrix}^T \quad (11)$$

The relation between the joint velocity and the end-effector velocity can be expressed as $$\dot{l}_1 = J\dot{x} \quad (12)$$

where $\dot{l}_1$ is the first derivative of $l_1$.

As discussed above, each pair of anchor point $A_i$ and $B_i$ can be a joint responsible for providing the desired DoF for the system 100. Furthermore, each joint may be a controllable device, such as an active device (e.g., a motor (e.g., a stepper motor)), or a passive device (e.g., a pulley with a brake).

Three active vibration control approaches are discussed to enable a person having ordinary skill in the art to make a system according to the present disclosure. The first control approach is an open-loop control system 200 shown in FIG. 2A. For a target pose x* of a CDPM (as described above, the target pose is the desired position of the end effector $F_e$ shown in FIG. 1), where * represents the future desired position of the end effector, the cable-length vector $l_{1i}*$ can be determined by solving the inverse kinematics problem of the CDPM. $l_{1i}*$ (i=1, 2, . . . , n) denotes the $i^{th}$ element of $l_1*$. According to the kinematics notations, one has $$l_{1i}* = \|a_i - (x* + b_i)\| \quad (13)$$

where $\| \|$ represents the norm of a vector. Since $l_e$ is a constant vector, if the cables are elastic, $l_s*$ can be derived as:

$$l_s* = l_1* - l_e - \Delta l_e \quad (14)$$

If the cables are inelastic (i.e., $\Delta l_e = 0$), $l_s*$ can be derived as:

$$l_s* = l_1* - l_e \quad (15)$$

The operation of the open-loop control system 200 is now described. The control system 200 starts out with 201 (the Start block). Then the same controller 200 or a separate controller (not shown) determines the desired position of the end effector (see $F_e$ in FIG. 1), as provided in block 202. In order to maintain tension in all the cables, the matrix provided by (14) can be solved to determine the length of the unwound portion of the cables 104 (see FIG. 1), as provided in block 204. Each actuator (not shown) associated with each cable 104 is thus activated in order to achieve the desired length 1, as shown in block 206. The solution is thus completed, as shown in block 208.

The target positions of actuators can be derived based on $l_s*$ as provided in (14). If actuators move to these target positions, the CDPM with inelastic cables will have the desired target pose. Of course, if there are large deformation in the unwound cables (thus, $\Delta l_e \neq 0$), the target pose calculations will be inaccurate.

Figure 2A:
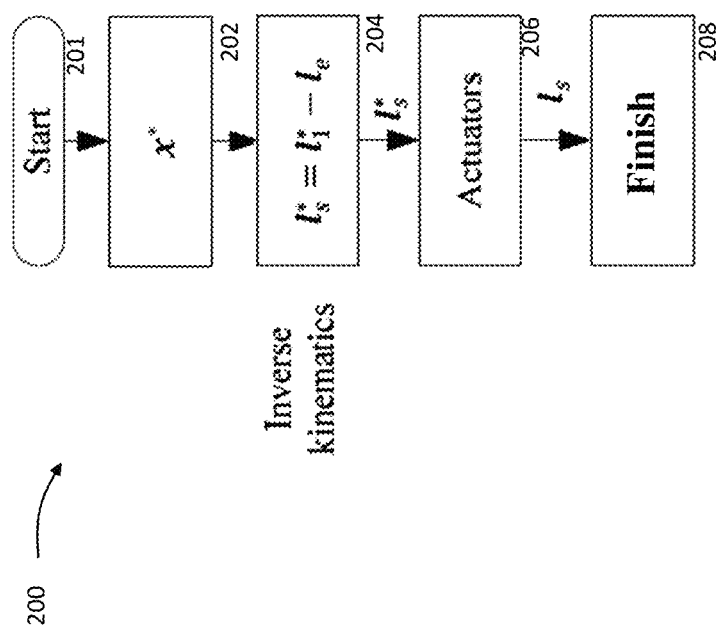
FIG. 2A is an open-loop control scheme for controlling the working platform of FIG. 1.
Figure 2B:
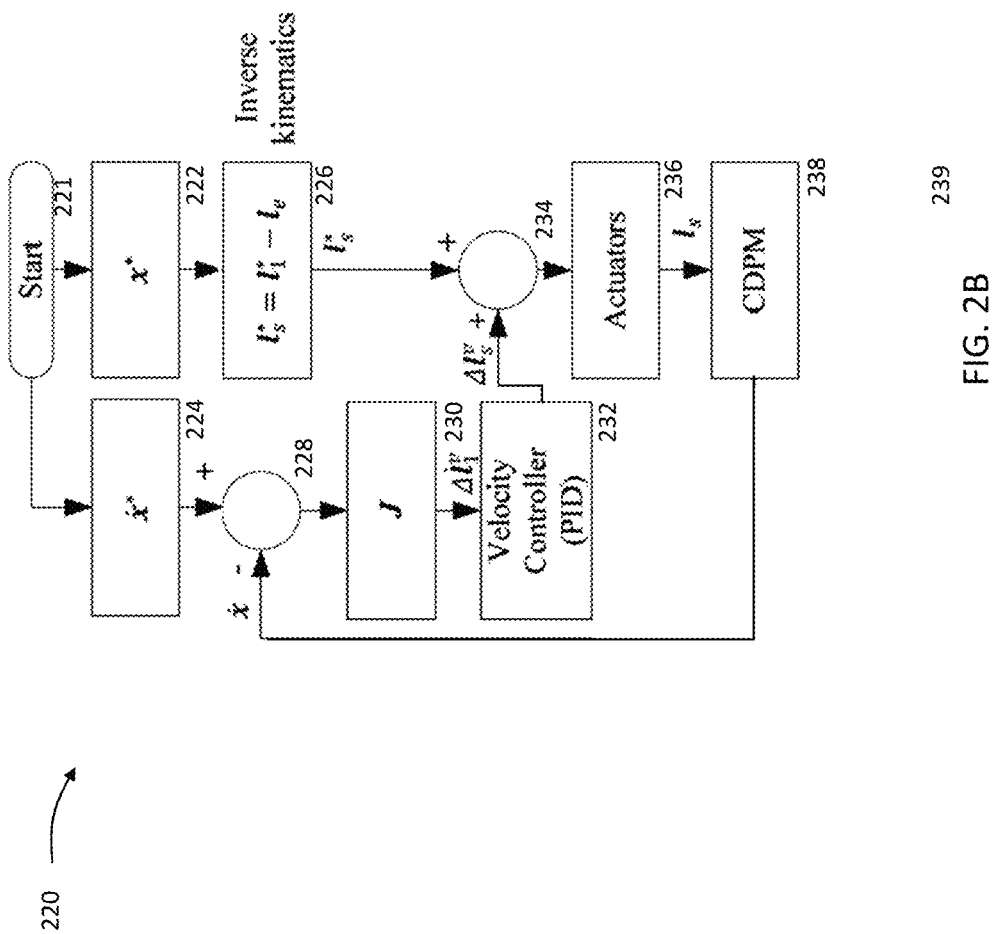
FIG. 2B is a first closed-loop control scheme for controlling the working platform of FIG. 1.

The second control approach is a first closed-loop control system 220 shown in FIG. 2B. For a target pose x* of a CDPM (as described above, the target pose is the desired position of the end effector $F_e$ shown in FIG. 1), where * represents the future desired position of the end effector, as an improvement to the performance of the open-loop control system 200, the velocity of the end effector is fed back to compensate for the elasticity of cables. The velocity feedback loop can be implemented in the following steps: 1) Transform the difference between the target velocity and the current velocity of the end-effector (i.e., ẋ*−ẋ) to a correctional velocity $\Delta\dot{l}_1^v$ of joints (i.e., anchor points: $A_1$, $A_2$, . . . $A_i$, . . . and $A_n$ and $B_1$, $B_2$, . . . $B_i$, . . . and $B_n$ shown in FIG. 1) based on (12) as provided below:

$$\Delta\dot{l}_1^v = J(\dot{x}* - \dot{x}) \quad (16)$$

and 2) Transform $\Delta\dot{l}_1^v$ to a correctional inelastic cable length $\Delta l_s^v$ using a velocity controller (see below) and add thereafter $\Delta l_s^v$ to the control signal of actuators.

The operation of the closed-loop control system 200 is now described. The control system 220 begins with the start block 221. Then the same controller 220 or a separate controller (not shown) determines the desired position (x*) and velocity (ẋ*) of the end effector (see $F_e$ in FIG. 1), as provided in blocks 222 and 224. In order to maintain tension in all the cables 104 (see FIG. 1), the matrix provided by (14) can be solved to determine the length of the unwound portion of the cables 104 (see FIG. 1), as provided in block 226. So far, this controller 220 operates similar to the open-loop controller 200 with the exception of obtaining the target velocity of the end effector (i.e., ẋ*). At the same time the Jacobian matrix calculated from (11) can be calculated in block 230 taking in as input the difference between the target and present pose velocity (i.e., ẋ*−ẋ), provided by the summer 228. The output of block 230 provides $\Delta\dot{l}_1^v$ to block 232 which is a velocity controller which uses a proportional-integral-derivative (PID) known to a person having ordinary skill in the art, to generate $\Delta l_s^v$. With the quantity $l_s*$ calculated, $\Delta l_s^v$ can be added thereto in added 234 to provide a more accurate control signal for the actuators as shown in block 236, as compared to the open-loop system 200 shown in FIG. 2A. Finally, in block 238, the pose velocity x of the end effector is calculated, which may be slightly different than the target pose velocity ẋ* and provided to the adder 228 as discussed above.

Figure 2C:
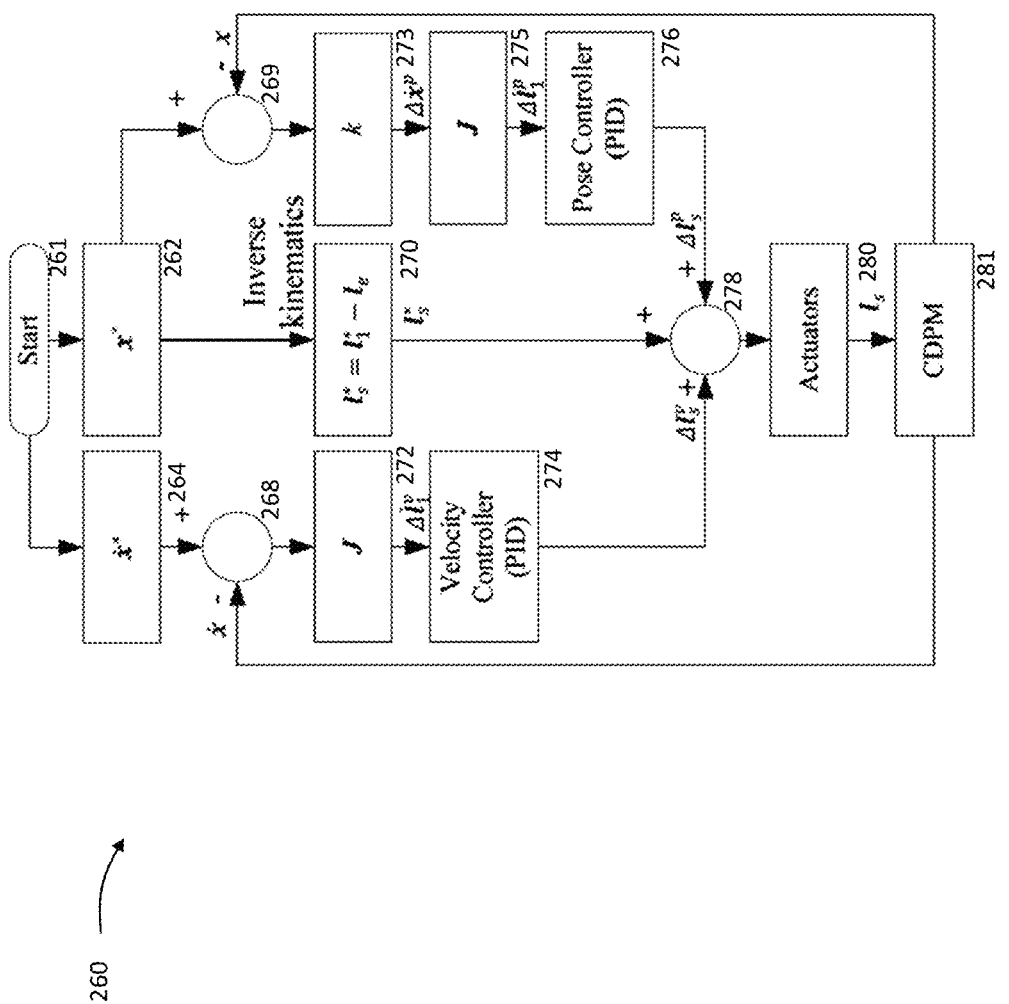
FIG. 2C is a second closed-loop control scheme for controlling the working platform of FIG. 1.

The third control approach is a second closed-loop control system 260 shown in FIG. 2C. For a target pose x* of a CDPM (as described above, the target pose is the desired position of the end effector $F_e$ shown in FIG. 1), where * represents the future desired position of the end effector, as an improvement to the performance of the open-loop control system 200 and the first closed-loop control system 220, both the velocity and the acceleration of the end effector are fed back to compensate for the elasticity of cables. The latter feedback control signal can be described as follow: 1) Transform the difference between the target pose and the current pose of the CDPM to generate a correctional velocity, denoted by $\Delta\dot{x}^p$ and provided as follows:

$$\Delta\dot{x}^p = k(x* - x) \quad (17)$$

where k is a constant coefficient; 2) Transform $\Delta\dot{x}^p$ to a correctional velocity denoted by of joints (i.e., anchor points: $A_1, A_2, \ldots A_i, \ldots$ and $A_n$ and $B_1, B_2, \ldots B_i, \ldots$ and $B_n$ shown in FIG. 1) based on (12) as provided below:

$$\Delta \dot{l}_1^P = J\Delta \dot{x}^P \quad (18)$$

and 3) Transform $\Delta \dot{l}_1^P$ to a correctional inelastic cable length $\Delta l_s^P$ via a pose controller (PID) and add $\Delta l_s^P$ to the control signal of actuators.

The operation of the closed-loop control system 260 is now described. The control system 260 begins with the start block 261. Then the same controller 260 or a separate controller (not shown) determines the desired position (x*) and velocity ($\dot{x}$*) of the end effector (see $F_e$ in FIG. 1), as provided in blocks 262, and 264. In order to maintain tension in all the cables 104 (see FIG. 1), the matrix provided by (14) can be solved to determine the length of the unwound portion of the cables 104 (see FIG. 1), as provided in block 270, in order to generate $l_s$*. So far, this controller 260 operates similar to the first closed-loop controller 220. With $l_s$* determined, this quantity and two other feedback signals ($\Delta l_s^v$ and $\Delta l_s^P$) are added to each other in adder 278 to generate signals for the actuators, as provided in block 280. At the same time the Jacobian matrix calculated from (11) can be calculated in block 272 taking in as input the difference between the target and present pose velocity (i.e., $\dot{x}$*–$\dot{x}$), provided by the adder 268. The output of block 272 provides $\Delta \dot{l}_1^v$ to block 274 which is a velocity controller which uses a proportional-integral-derivative (PID) known to a person having ordinary skill in the art, to generate $\Delta l_s^v$ as input to the adder 278. Similarly, at the same time the actual pose data (x) is subtracted from the target pose data (x*) by the adder 269 and the output multiplied by the constant k, as discussed above, in block 273 to obtain $\Delta \dot{x}^P$. Following (18) the latter is multiplied by the Jacobian matrix calculated from (11) in block 275 and the result fed to a pose controller PID in block 276. The output of 276 is $\Delta l_s^P$ which is added to $\Delta l_s^v$ in the adder 278 along with $l_s$* as discussed above. Once the control signals for the actuators have been calculated and the actuators actuated in correspondence thereto, the velocity and position data from the CDPM is determined in block 281 and provided to the adder 268 and 269 as discussed above.

Figure 2D:
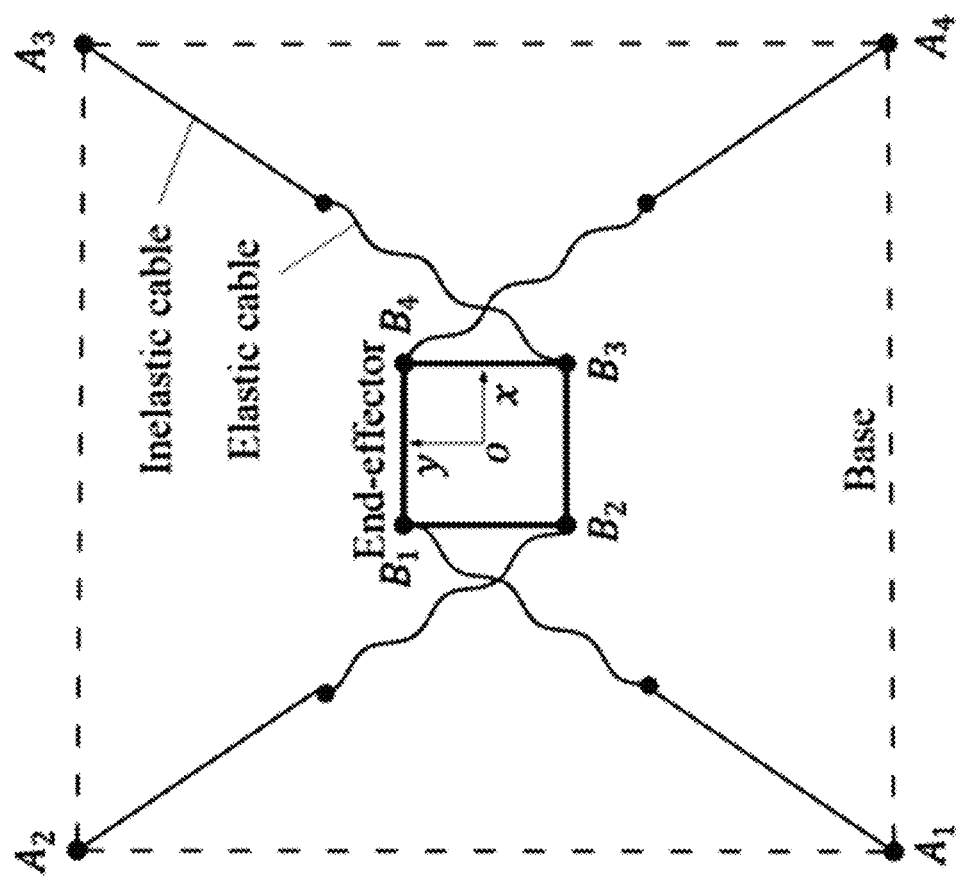
FIG. 2D is a schematic of a working platform coupled to a base platform attached to a UAV, depicting vectors defining connections between the working platform and the base platform for a 3 degrees of freedom system.

Next simulation results are presented in order to make a comparison between the three approaches (i.e., the open-loop control system 200—FIG. 2A, the first closed-loop control system 220—FIG. 2B, and the second closed-loop control system 260—FIG. 2C). All three control strategies are applied to a planar CDPM with three DoFs and four cables to trace a target trajectory. Referring to FIG. 2D, a schematic of an exemplary CDPM for this purpose is shown. Position-controlling motors with pulleys are used in this embodiment at anchor points $A_1, A_2, A_3, A_4$, where each cable between the corresponding pair of anchor points $A_i$ and $B_i$ includes an elastic portion and an inelastic portion. Since the close-loop transfer function of a motor can be approximated by a first-order system, as it is known to a person having ordinary skill in the art, the transfer function of the position-controlling motors utilized in the embodiment of FIG. 2C has the following form in the Laplace domain:

$$C_m = 1/(0.1s+1) \quad (19)$$

In the exemplary planar CDPM shown in FIG. 2D, the base (identified by $A_1, A_2, A_3$, and $A_4$) and the end-effector (identified by $B_1, B_2, B_3$, and $B_4$) both have substantially a square shape. The origin of the base frame (a stationary frame with respect to the end effector) is located at the centroid of the base (identified as O). The pose of the end-effector in the base frame is represented by x, y, and θ having units: m, m, deg, respectively. In this setting, the pose velocity is identified by $\dot{x}$, $\dot{y}$, and $\dot{\theta}$ having units: m/sec, m/sec, and deg/sec, respectively. When the end-effector is at its resting position and without any angular orientation, its origin coincides with the origin of the base frame, as shown in FIG. 2D. In that situation, positions of the anchor points $A_i$ and $B_i$ where i=1, 2, 3, 4 in the base frame are shown in Table I. Two types of elastic cables (i.e., elastic cable type I and elastic cable type II) are used in the simulation and parameters used in the simulation are listed in Table II.

TABLE I

Positions of the anchor points (Unit: m)

| | |
|---|---|
| $A_1$: (−0.75, −0.75) | $B_1$: (−0.15, 0.15) |
| $A_2$: (−0.75, 0.75) | $B_2$: (−0.15, −0.15) |
| $A_3$: (0.75, 0.75) | $B_3$: (0.15, −0.15) |
| $A_4$: (0.75, −0.75) | $B_4$: (0.15, 0.15) |

TABLE II

Parameters of the CDPM in the simulation

| Parameters | Value |
|---|---|
| $l_{ei}$ | 0.25 m |
| $EA/l_{ei}$ of elastic cable type I | 16000 N/m |
| $EA/l_{ei}$ of elastic cable type II | 1600 N/m |
| The effector's mass | 10 kg |
| The effector's moment of inertia | 0.0193 kg · m² |

Assuming elastic cable type II is used and the CDPM is stable at $x^* = [0,0,0]^T$ (unit: m, m, deg) and $\dot{x} = [0,0,0]^T$ (unit: m/s, m/s, deg/s), $l_s$* can be calculated using the following procedure. Based on (3), one has $$l_e = [0.25, 0.25, 0.25, 0.25]^T$$

and the matrices in (10) are $$G = [0, -98, 0]^T$$

$$M = \begin{bmatrix} 10 & 0 & 0 \\ 0 & 10 & 0 \\ 0 & 0 & 0.0193 \end{bmatrix}$$

$$C = \begin{bmatrix} 0 & 0 & 0 \\ 0 & 0 & 0 \\ 0 & 0 & 0 \end{bmatrix}$$

The Jacobian matrix of the system 100 can be calculated from (11)

$$J = -\begin{bmatrix} 0.555 & 0.555 & -0.555 & -0.555 \\ 0.832 & -0.832 & -0.832 & 0.832 \\ 0.208 & -0.208 & 0.208 & -0.208 \end{bmatrix}^T$$

Then (10) can be written as $$\begin{bmatrix} 10 & 0 & 0 \\ 0 & 10 & 0 \\ 0 & 0 & 0.0193 \end{bmatrix} \begin{bmatrix} 0 \\ 0 \\ 0 \end{bmatrix} + \begin{bmatrix} 0 & 0 & 0 \\ 0 & 0 & 0 \\ 0 & 0 & 0 \end{bmatrix} \begin{bmatrix} 0 \\ 0 \\ 0 \end{bmatrix} +$$

-continued $$\begin{bmatrix} 0 \\ -98 \\ 0 \end{bmatrix} = \begin{bmatrix} 0.555 & 0.555 & -0.555 & -0.555 \\ 0.832 & -0.832 & -0.832 & 0.832 \\ 0.208 & -0.208 & 0.208 & -0.208 \end{bmatrix} \tau$$

There are four variables (i.e., cable tensions) and three equations in the above equation. Using the minimum norm least-squares approach, cable tensions can be solved by minimize the norm of the tension vector $\tau$ $\tau=[0,58.89,58.89,0]^T$ The extended lengths of the cables can be calculated from (9)

$\Delta l_e=[0,0.0092,0.0092,0]^T$

Cable lengths can be obtained by solving the inverse kinematics problem of the CDPM in (13)

$l_1{}^*=[1.082,1.082,1.082,1.082]^T$

Finally, $l_s{}^*$ can be calculated from (14)

$$\begin{aligned} l_s^* &= l_1^* - l_e - \Delta l_e \\ &= [1.082, 1.082, 1.082, 1.082]^T - [0.25, 0.25, 0.25, 0.25]^T - \\ &\quad [0, 0.0092, 0.0092, 0]^T \\ &= [0.832, 0.832, 0.832, 0.832]^T \end{aligned}$$

In this case, and in reference to the controller 260 of FIG. 2C, the coefficient k in (17) is 1. The transfer function of the velocity controller (blocks 232 and 274, in FIGS. 2B and 2C, respectively) utilized in the controllers 220 and 260 has the following form in the Laplace domain:

$C_v=50+1/s+20s$ (20)

while the transfer function of the pose controller (block 275 in FIG. 2C) has the following form in the Laplace domain:

$C_p=100+0.1/s+50s$ (21)

Figure 2E:
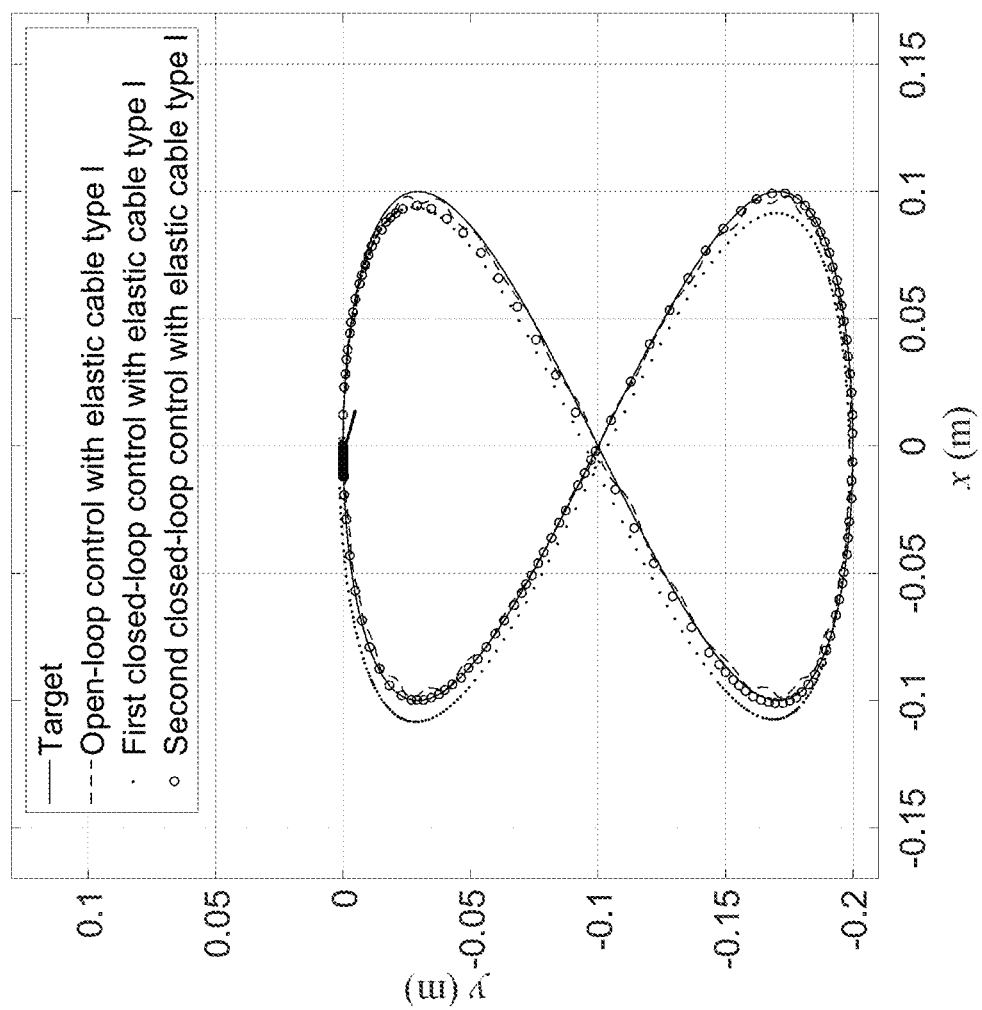
FIG. 2E is a graph of x vs. y for the system shown in FIG. 2D following a figure-8 trajectory for cables having a first elasticity.
Figure 2F:
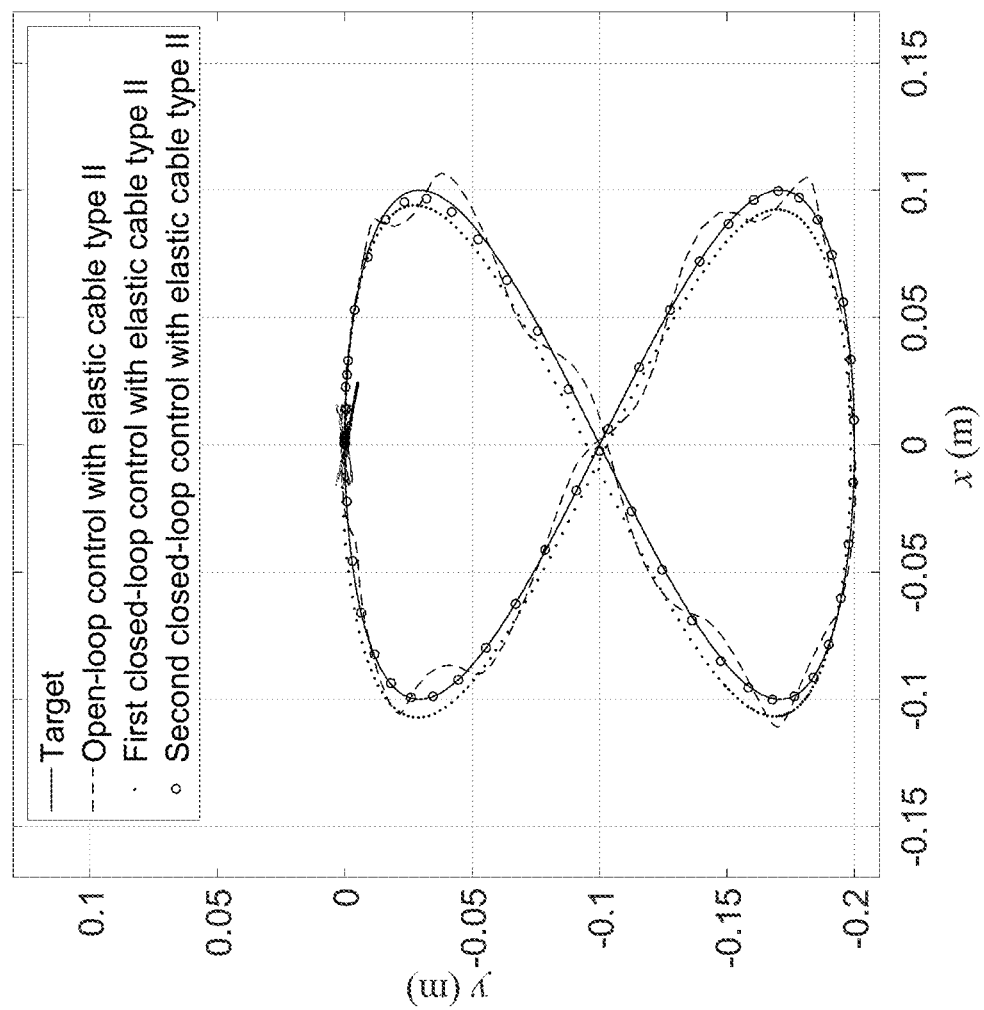
FIG. 2F is a graph of x vs. y for the system shown in FIG. 2D following a figure-8 trajectory for cables having a second elasticity.
Figure 2G:
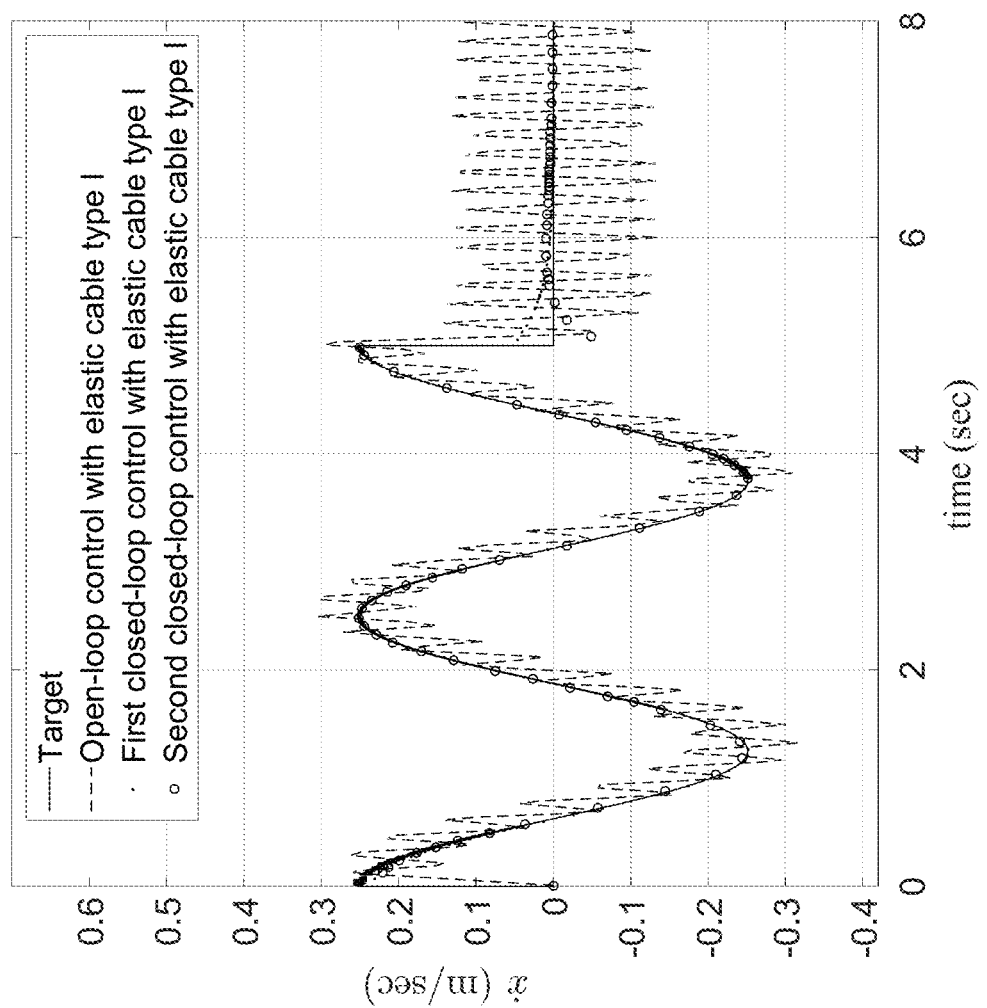
FIG. 2G is a graph of velocity in x direction vs. time for the system shown in FIG. 2D following a figure-8 trajectory for cables having a first elasticity.
Figure 2H:
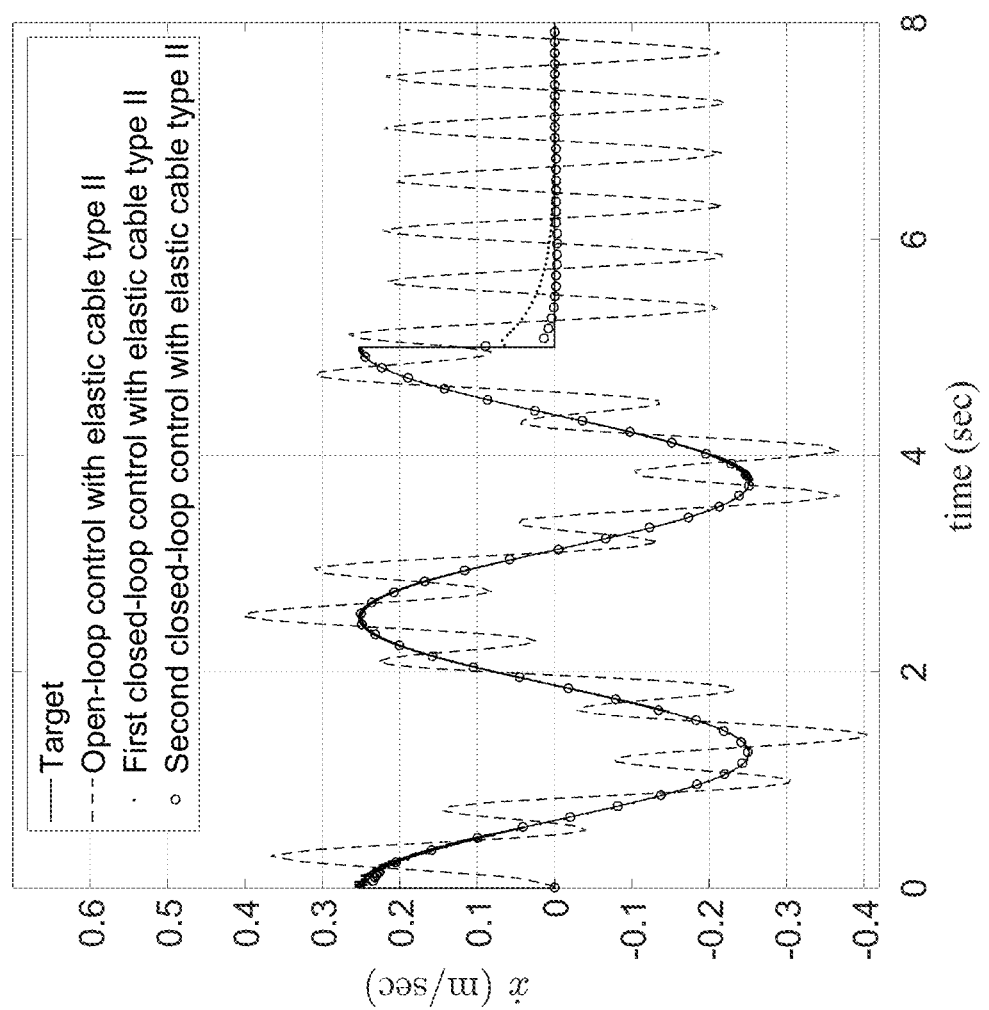
FIG. 2H is a graph of velocity in x direction vs. time for the system shown in FIG. 2D following a figure-8 trajectory for cables having a second elasticity.
Figure 21:
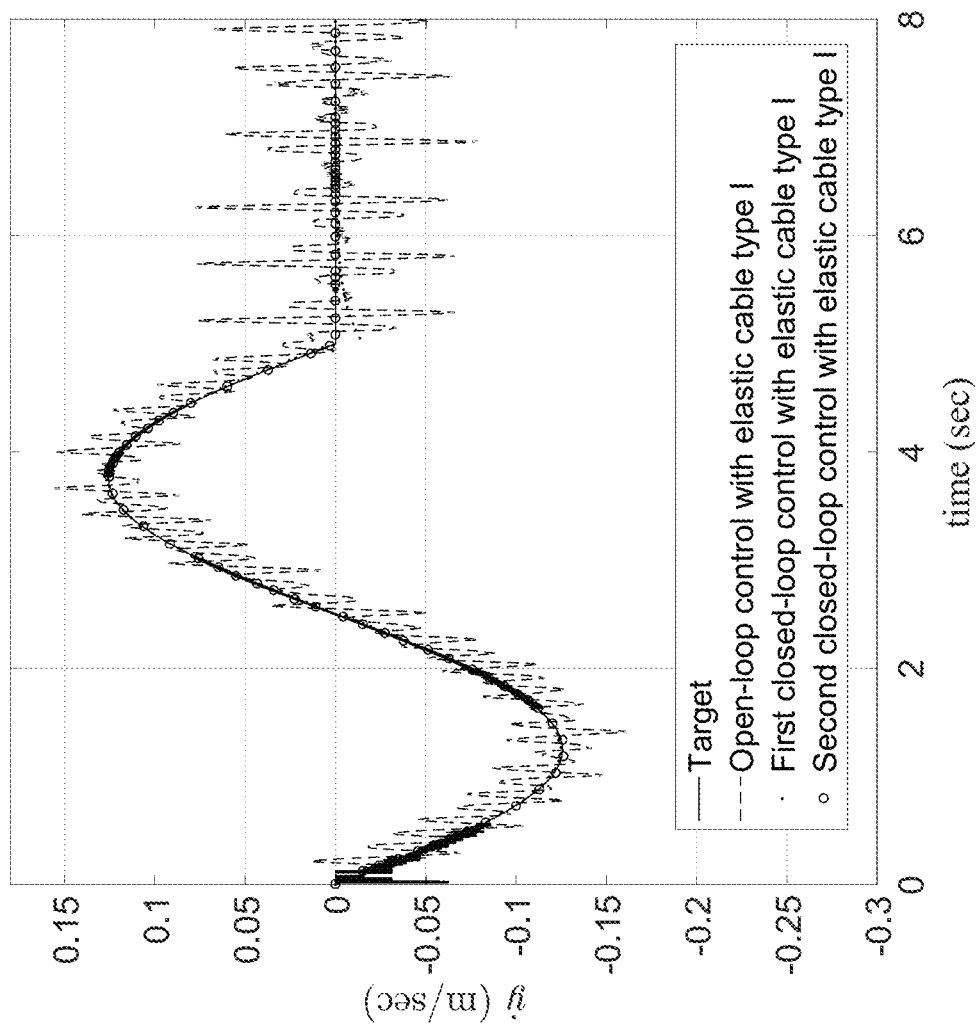
Figure 2J:
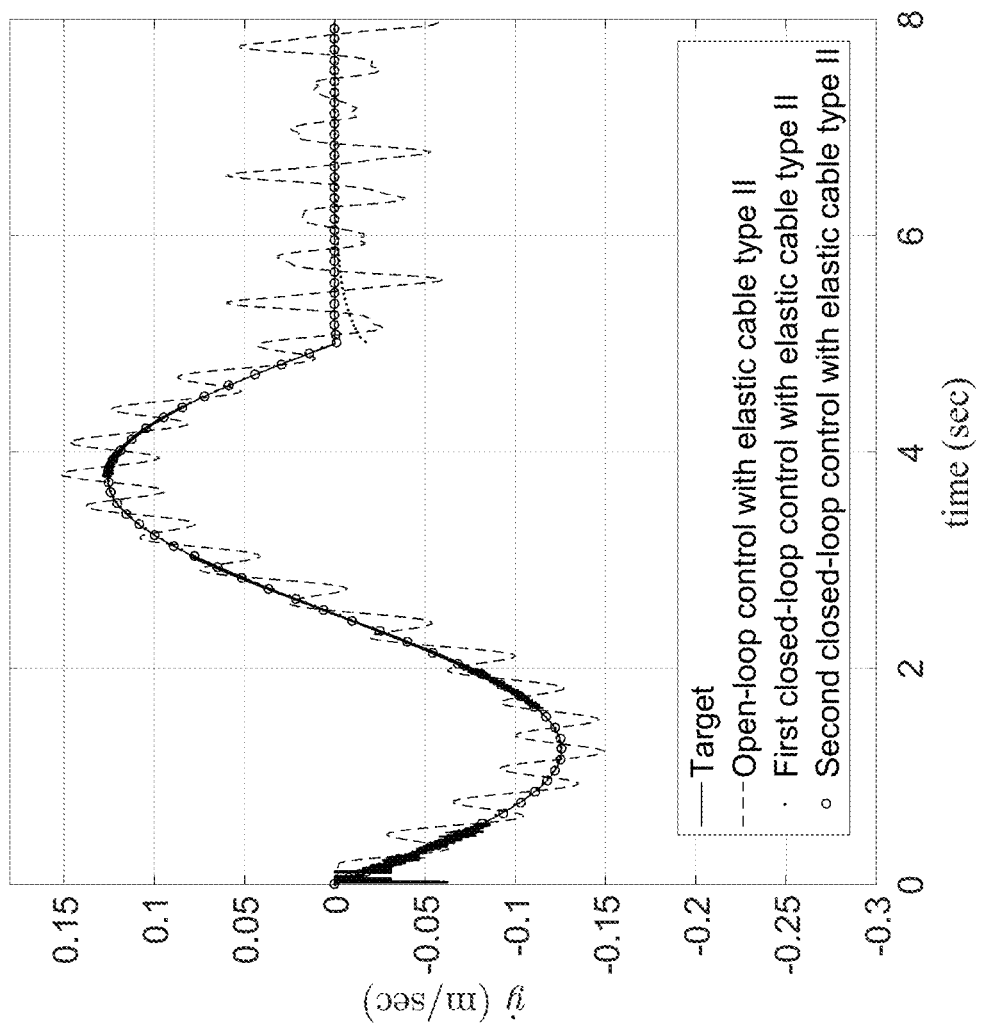
FIG. 2J is a graph of velocity in y direction vs. time for the system shown in FIG. 2D following a figure-8 trajectory for cables having a second elasticity.
Figure 2K:
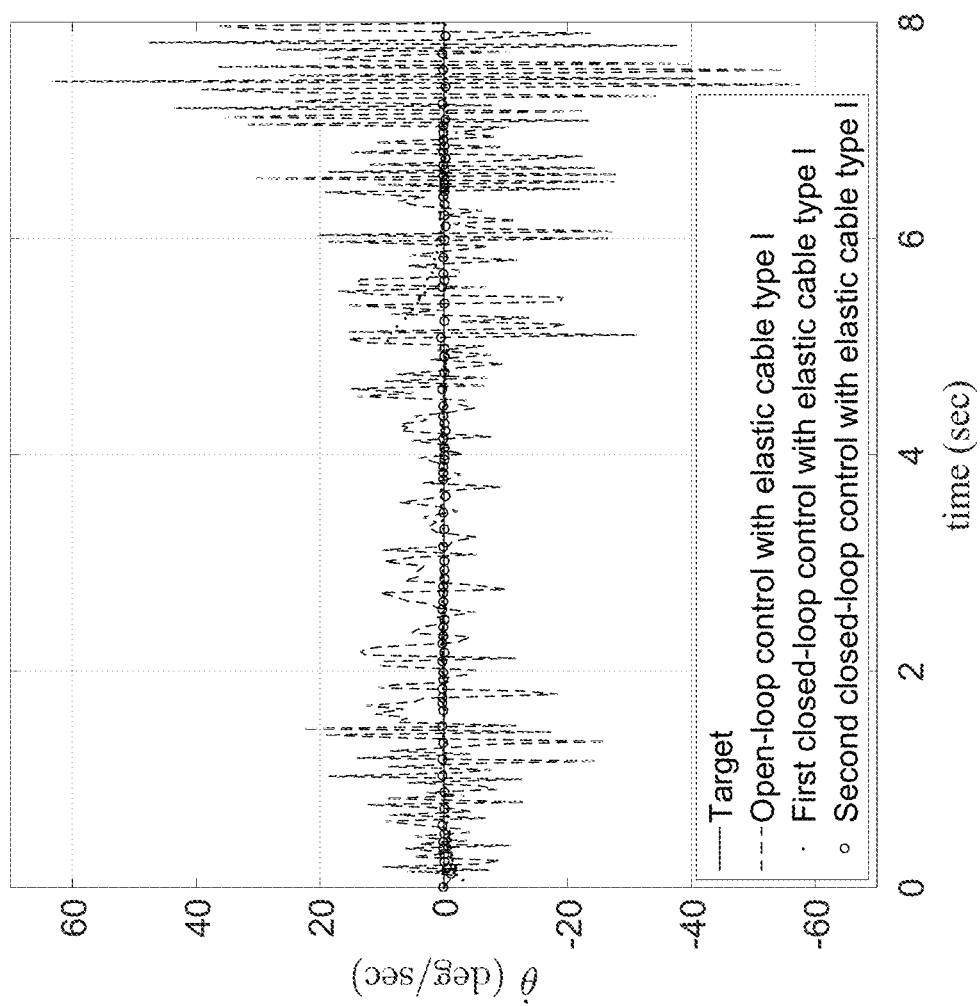
FIG. 2K is a graph of angular velocity vs. time for the system shown in FIG. 2D following a figure-8 trajectory for cables having a first elasticity.
Figure 2L:
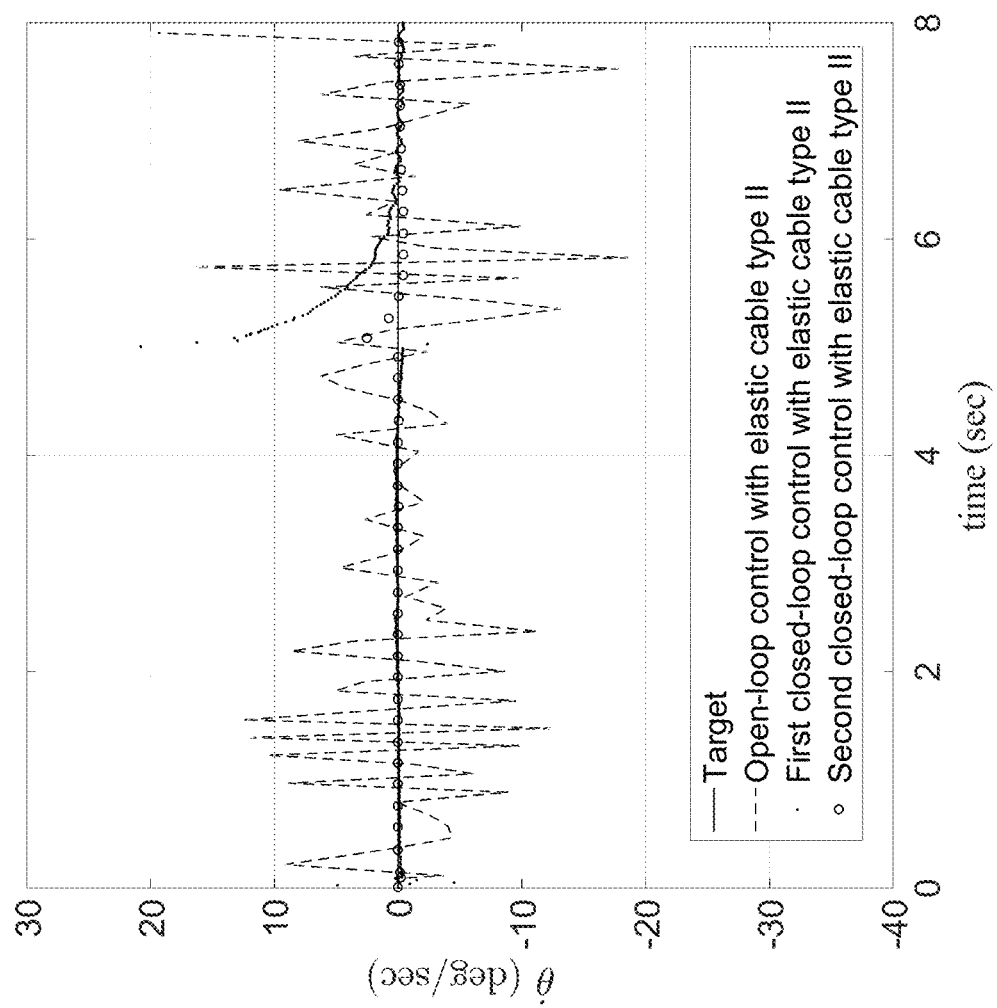
FIG. 2L is a graph of angular velocity vs. time for the system shown in FIG. 2D following a figure-8 trajectory for cables having a second elasticity.

The CDPM with elastic cable types I and II, respectively, is controlled to track a target trajectory with zero orientation via each of the three control strategies. The results are plotted in FIGS. 2E and 2F which represent y(m) vs. x(m) of the end-effector of the CDPM using cable types I and II, respectively. Results of the three different control schemes (i.e., open-loop control with reference to FIG. 2A, first closed-loop control with reference to FIG. 2B, and second closed-loop control with reference to FIG. 2C) are shown in FIGS. 2E and 2F as well as the following-described FIGS. 2G, 2H, 2I, 2J, 2K, and 2L. With reference to FIGS. 2E and 2F, the target trajectory has an "8" shape. Initially, the end-effect is at (0, 0, 0). The CDPM is controlled to move along the 8-shape trajectory from (0, 0, 0) to the positive direction of the x axis of the base frame, and then back to (0, 0, 0) with a full stop in 5 seconds. The CDPM maintains zero orientation all the time.

Referring to FIGS. 2E and 2F, the CDPM has a delay or an overshoot when using the open-loop control strategy and the first closed-loop control strategy shown in FIGS. 2A and 2B, respectively. However, using the second closed-loop control strategy shown in FIG. 2C, the CDPM can return back to the desired trajectory. The target is shown with solid lines, while the different strategies are shown in dashed lines, dotted lines, and circled lines. In this and other cases discussed below, the open-loop control strategy refers to the control strategy shown in FIG. 2A, the first closed-loop strategy refers to the control strategy shown in FIG. 2B, and the second closed-loop strategy refers to the control strategy shown in FIG. 2C.

Similarly, the pose data can be shown vs. the desired trajectory for different strategies. As can be seen the two closed loop strategies provide significantly better results. With reference to FIGS. 2G, 2H, 2I, 2J, 2K, and 2L, velocity data ($\dot{x}$, $\dot{y}$, and $\dot{\theta}$) are shown with respect to time for both cable types I and II, respectively. Using the two closed-loop control strategies of 220 and 262 shown in FIGS. 2B and 2C, respectively, the pose of the CDPM can attenuate to zero when the target pose is to come to a stop. The average position deviation using the three control strategies are listed in Table III.

TABLE III

Performances of the three control strategies

|  | Average position deviation |
|---|---|
| Open-loop control system 200 with cable type I | 0.0120 m |
| Open-loop control system 200 with cable type II | 0.0159 m |
| First closed-loop control system 220 with type I | 0.0088 m |
| First closed-loop control system 220 with cable type II | 0.0118 m |
| Second closed-loop control system 260 with type I | 0.0029 m |
| Second closed-loop control system 260 with cable type II | 0.0012 m |

Figure 3:
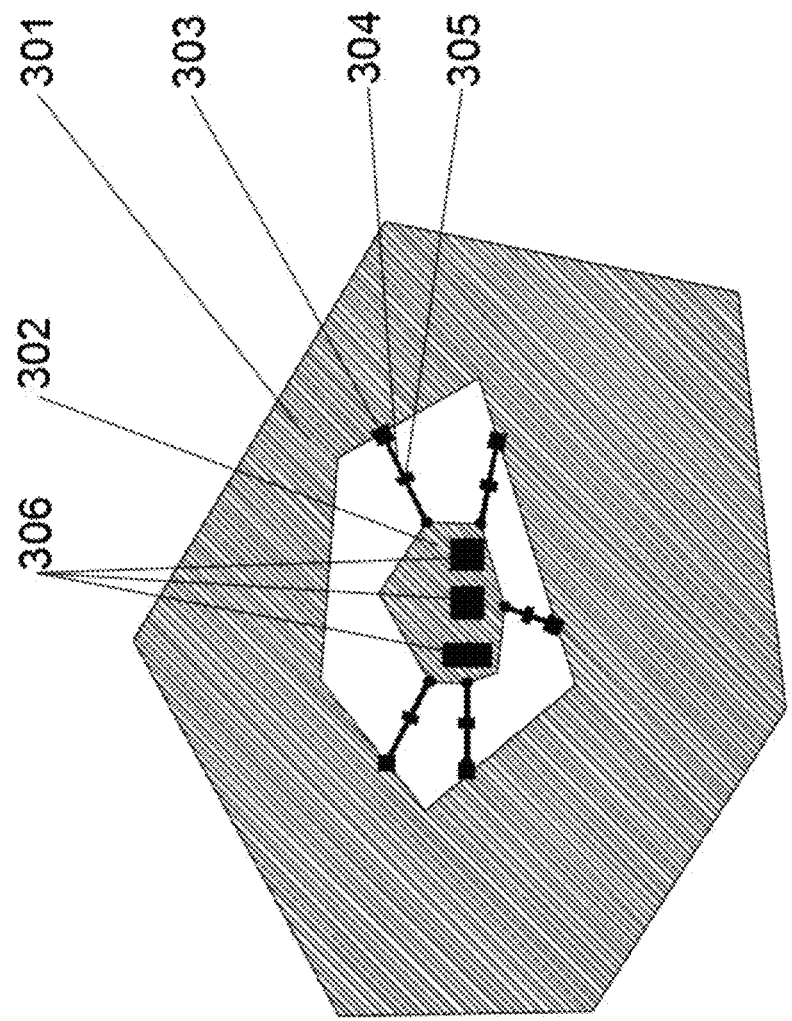
FIG. 3 is a schematic of a vibration control system having a working platform and a base platform attached to a UAV.

An adaptive vibration control approach is discussed to enable a person having ordinary skill in the art to control vibration according to the present disclosure. Referring to FIG. 3, a schematic of a UAV vibration control system 300 is depicted. The system 300 includes a base platform 301, a working platform 302 with sensors and instruments 306 mounted thereon, a set of cables 304, and corresponding actuators 303. The base platform 301 is rigidly mounted on a UAV (not shown) and receives undesired vibration from the UAV (not shown). The body of the UAV (not shown) itself can also work as the base platform 301. The working platform 302 is connected to the base platform 301 and driven by a set of cables 304 through actuators 303. The working platform 302 is the host of sensors and instruments 306 to be protected from vibration. Actuators 303 (e.g., piezoelectric ceramics, electrical machines such as motors, etc.) are used to control cable tensions. Cables 304 connect the base platform 301 and the working platform 302 with a tension in each cable. The proper selection of the set of cable tensions can attenuate the transmission of vibration from the base platform to the working platform. Cables 304 can be made of steel, carbon fiber, rubber and so on, depending on the required modulus of elasticity of the cables. Additionally, cable dampers 305 can optionally be used to further improve the system's performance on vibration isolation. The UAV vibration control system 300 works in concert with the control schemes described above with reference to FIGS. 2A, 2B, and 2C.

Figure 4:
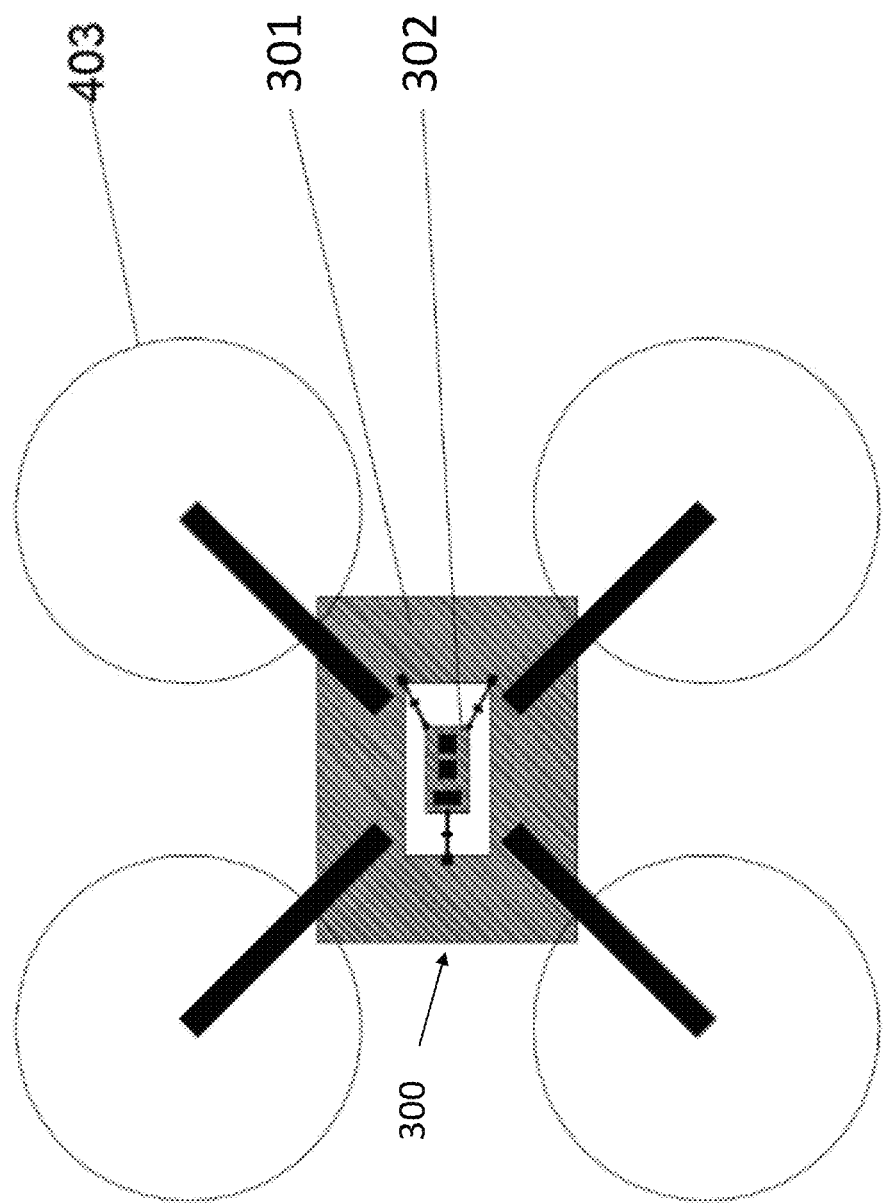
FIG. 4 is a UAV including the system shown in FIG. 3.

Referring to FIG. 4, a schematic of an exemplary UAV 400 is depicted with the system 300 mounted thereto. The base platform 301 is rigidly mounted on the UAV's body such that it suffers from the vibration generated by the propellers 403. The disclosed cable-driven adaptive vibration control system 300 is applied to isolate the vibration from the working platform 302 and the sensors and instruments on the working platform 302.

Figure 5:
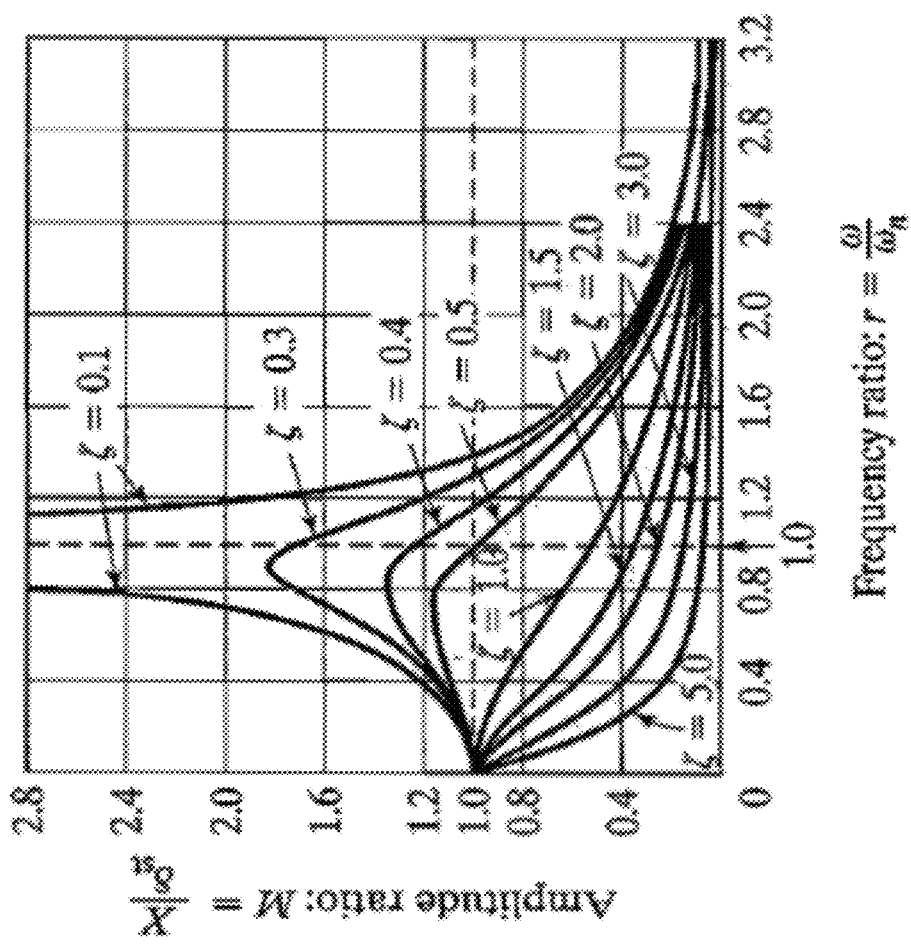
FIG. 5 is a graph of amplitude ratio vs. frequency ratio for the vibration control system of FIG. 3.

The natural frequency of the working platform of the disclosed adaptive vibration control system will be adaptively controlled by changing cable tensions through actuators 303. It should be noted that the pose (i.e., position and orientation) of the working platform 302 remains substantially unchanged as tensions on the cables 304 change. The cable tensions change to adapt to different frequencies of vibration by causing a change in the natural frequency of the working platform 302. The natural frequency of the working platform 302 is controlled such that the frequency ratio (i.e., frequency ratio is the ratio of frequency of the external vibration divided by the natural frequency of the adaptive vibration control system) is larger than two. Referring to FIG. 5 a graph of amplitude ratio (i.e., the ratio of output amplitude to incoming amplitude of vibration) is shown as a function of the frequency ratio (described above) for different damping ratios. A close inspection of FIG. 5 reveals that when the frequency ratio is greater than two, the amplitude ratio will be smaller than 0.4, which means vibrational disturbances are drastically attenuated. Within the range of the controllable natural frequencies of the working platform 302, the lower the natural frequency, the larger the frequency ratio for a specific vibration, and the smaller the amplitude of vibration transmission. The sensors and instruments 306 on the UAV 400 can be protected by isolating them from vibration disturbances by decreasing the amplitude ratio and thus increase their performances and life.

According to the present disclosure, cable tensions can be adjusted while the pose (position and attitude) of the working platform 302 is kept substantially unchanged relative to the base platform 301 of the system 300. Actuators 303 (e.g., piezoelectric ceramics) of the system are used to adjust cable tensions. The relationship between the stiffness of the working platform 302 and cable tensions depends on the configuration of the system (i.e., DoF, number of cables 304, locations of cables' attaching points on the base platform 301 and the working platform 302, etc.), the pose of the working platform 302, and the stiffness characteristics of cables 304. To design a vibration attenuation system according to the present disclosure, in an initial design phase, based on a specific application (e.g., DoF, frequencies of the undesired vibration disturbances, etc.), a system configuration including stiffness characteristics of cables 304 and the relationship between the stiffness of the working platform 302 and cable tensions at various poses that are needed for the sensors to operate (e.g., a camera mounted on the working platform may require different poses) are predetermined. Once these basic configurations have been identified, the system 300 in an operation phase can be configured to automatically adjust cable tensions through actuators 303 based on the stiffness-tension relationship established in the design phase in order to maintain the natural frequency of the system 300 far lower than that of the disturbances (thereby increasing the ratio described above to about 2 and higher numbers). In doing so, the system is also configured to attenuate disturbing vibration with medium to high frequencies from the environment and thereby avoid resonance (i.e., frequency ratio of 1).

The number of necessary cables 304 depends on the DoF. A minimum of N+1 cables are needed to attenuate vibrations with N DoFs. For example, in the case of vibrations with six DoFs, at least seven cables are needed. In the case of vibrations with three DoFs, at least four cables are needed.

The mass and inertia of the system is deterministic for a specific design or application. The stiffness of the working platform 302 depends on the stiffness of cables, pose (configuration) of the system and cable tensions. If DoF≥2, lumped mass parameters and lumped modulus parameters are mathematically treated as matrices. The free vibration of the working platform 302 around any equilibrium configuration can be derived as:

$$M\delta\ddot{x}+N\delta\dot{x}+K\delta x=0 \tag{22}$$

where M is the mass matrix; N is the damping matrix; and K is the stiffness matrix. $\delta x$ represents an infinitesimal motion of the working platform 302. The stiffness of the system can be decomposed into elastic stiffness and antagonistic stiffness:

$$K=K_e+K_t \tag{23}$$

where $K_e$ is the elastic stiffness matrix and $K_t$ is the antagonistic stiffness matrix. The elastic stiffness depends on the stiffness of cables and the pose of the working platform 302, while the antagonistic stiffness relies on cable tensions and the pose of the working platform 302.

The natural frequencies of the working platform 302 can be obtained by transforming (22) into modal space and solving the generalized eigenvalue problem associated with the generalized mass matrix M and stiffness matrix K. To this end, a set of modal coordinates q is defined such that $$\delta x=E\eta \text{ and } \delta\dot{x}=E\dot{\eta} \tag{24}$$

Then the perturbation (22) can be transformed into the following less coupled form in terms of modal coordinates:

$$\ddot{\eta}+E^T NE\dot{\eta}+\Lambda^2 \eta=0 \tag{25}$$

$$\Lambda=\text{diag}(\lambda_1,\lambda_2,\ldots,\lambda_n) \tag{26}$$

where $\Lambda$ is a diagonal matrix whose diagonal components are the natural frequencies of the system at the given pose; and E is the n×n eigenmatrix (or the mode shapes) of the working platform 302.

Tightening the cables 304 can affect the natural frequency of the working platform 302. Loosening or tightening cables is a one-time task for a specific application. That is to say, the system doesn't have to loosen or tighten cables periodically to counteract the disturbance if the frequency of the disturbance does not change. The system decreases the amplitude of the disturbances transmitted to its working platform 302 (through cables 304). In addition, the disclosed system 300 includes cable dampers 305 which can increase the entire damping coefficient of the system for each cable 304.

Figure 6:
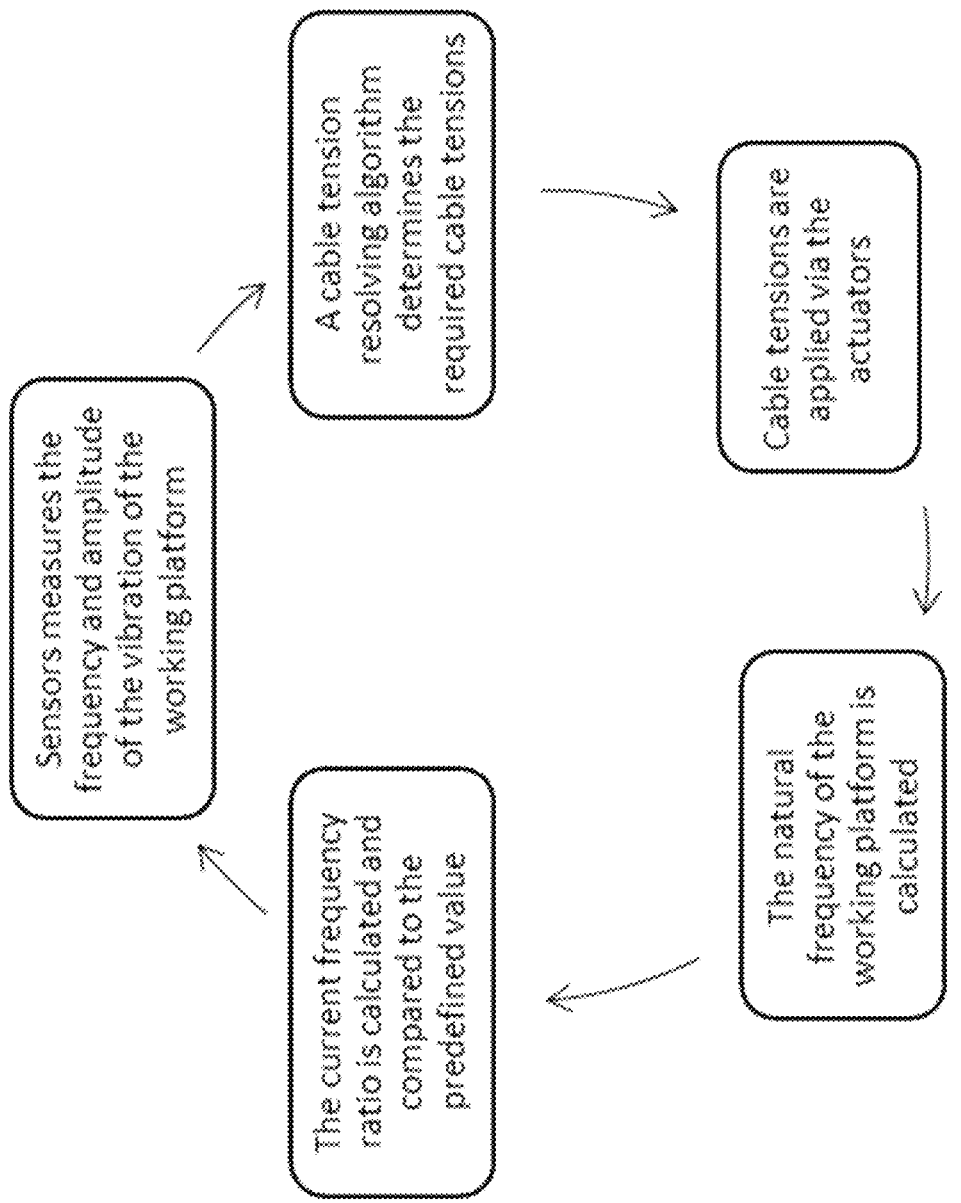
FIG. 6 is a graph of a control scheme for the vibration control system of FIG. 3.

Referring to FIG. 6, a flowchart of yet another control mechanism of system 300 which continuously recalculates tensions for the cables 304 in order to maintain the natural frequency of the working platform 302 as described above. Sensors on the working platform measure the frequency and amplitude of the vibration of the working platform at first. A cable tension resolving algorithm using the above relationships is applied to determine the required cable tensions that can achieve the natural frequency of the working platform based on a predetermined frequency ratio (ratio of measured frequency to the natural frequency of the working platform based on cable tensions). Cable tensions are applied via the actuators 303 and the current natural frequency is calculated from (26). Then, the frequency ratio (the frequency of the external vibration divided by the current natural frequency of the working platform 302) is calculated to verify if it is at the predefined (i.e., desired) value. If the frequency ratio is lower than the predefined value due to, e.g., change in external vibration of the UAV because of a gust, the operation process repeats itself. The flow chart in FIG. 6 is a closed-loop. It iterates repeatedly until the frequency ratio is at the predefined value, which will allow the cable-driven adaptive vibration control system to effectively attenuate the external vibration.

Those having ordinary skill in the art will recognize that numerous modifications can be made to the specific implementations described above. The implementations should not be limited to the particular limitations described. Other implementations may be possible.

The invention claimed is:

1. A vibration control drive system used in an unmanned aerial vehicle (UAV), comprising:
   a base platform fixedly coupled to a UAV structure;
   a working platform coupled to the base platform by two or more cables at two or more connection points on the working platform;
   two or more actuators positioned either on the base platform or the working platform, each actuator configured to receive a signal to adjust tension in a corresponding cable; and
   a first controller coupled to and adapted to control the two or more actuators, whereby two or more control signals are calculated for the two or more actuators based on a target position from a current position of the working platform according to one of (i) an open-loop configuration, (ii) a first closed-loop configuration utilizing velocity of the working platform as a feedback signal, or (iii) a second closed-loop configuration utilizing velocity of the working platform as a first feedback signal and the position information of the working platform as a second feedback signal,
   wherein each of (i) the open-loop, (ii) the first closed loop, and (iii) the second closed loop configurations initially calculates a target pose vector of the working platform, and
   wherein the target pose vector is calculated based on
   $l_1=[l_{11}\ l_{12}\ \ldots\ l_{1n}]^T,\ l_s=[l_{s1}\ l_{s2}\ \ldots\ l_{sn}]^T,$
   $l_e=[l_{e1}\ l_{e2}\ \ldots\ l_{en}]^T$ whereby
   $l_{1i}$ represents a length of each of the two or more cables and which includes $l_{si}$ which represents an inelastic portion and $l_{ei}$ which represents an elastic portion,
   $l_s^*=l_1^*-l_e$ where * denotes a target representation of the working platform, and is calculated based on
   $M\ddot{x}+C\dot{x}+G=-J^T\tau$
   where M represents inertia matrix,
   C represents Coriolis matrix,
   G represents gravity matrix,
   J represents Jacobian matrix, and
   $\tau$ represents tension in the two or more cables, which yields n−1 equations for n cable tension unknowns which can be solved for a tension solution, and where tension and the change in $l_e$ are related based on
   $\tau=EA\cdot\mathrm{diag}^{-1}(l_e)\Delta l_e$, where
   E represents Young's modulus of elasticity of the elastic portion and A represents cross sectional area of each of the two or more cables, and
   $\Delta l_e$ represents extended length of each of the two or more cables and is defined by $l_1-l_s-l_e$ and $$\mathrm{diag}^{-1}(l_e) = \begin{bmatrix} \frac{1}{l_{e1}} & 0 & 0 & 0 \\ 0 & \frac{1}{l_{e2}} & 0 & 0 \\ 0 & 0 & \ddots & 0 \\ 0 & 0 & 0 & \frac{1}{l_{en}} \end{bmatrix}.$$

2. The drive system of claim 1, wherein the n−1 equations and n unknowns can be solved for each tension of the two or more cables based on minimum norm least-squares.

3. The drive system of claim 2, wherein the Jacobian matrix is defined by $$J = -\begin{bmatrix} u_1 & u_2 & \ldots & u_n \\ b_1 \times u_1 & b_2 \times u_2 & \ldots & b_n \times u_n \end{bmatrix}^T,$$

where $u_i$ represents a unit vector along the $i^{th}$ cable and $b_i$ represents the position vector of the connection point through which the $i^{th}$ cable is connected to the working platform.

4. The drive system of claim 1, further comprising one or more velocity sensors configured to provide velocity information of the working platform.

5. The drive system of claim 4, further comprising one or more position sensors configured to provide position information of the working platform.

6. The drive system of claim 1 further comprising a second controller configured to reduce vibration by adjusting tension in the two or more cables thereby adjusting a natural frequency of the working platform in response to frequency of vibration experienced by the working platform in order to maintain a frequency ratio (FR) defined as a ratio of vibration frequency to the natural frequency of the working platform at or above a predetermined value.

7. The drive system of claim 6, further comprising one or more sensors configured to provide vibration information of the working platform.

8. The system of claim 7, the second controller configured to:
   receive signals from the one or more vibration sensors;
   determine a cable tension based on a previous calculated value of the natural frequency of the working platform and the FR;
   provide signals for the two or more actuators to adjust the corresponding cables;
   calculate a new natural frequency of the working platform; and
   compare the FR to a predetermined value.

9. A vibration control system for an unmanned aerial vehicle (UAV), comprising:
   a base platform fixedly coupled to a UAV structure;
   a working platform coupled to the base platform by two or more cables at two or more connection points on the working platform;
   two or more actuators positioned either on the base platform or the working platform, each actuator configured to receive a signal to adjust tension in a corresponding cable;
   a first controller configured to provide signals to the actuators; and
   a second controller coupled to and adapted to control the two or more actuators, whereby two or more control signals are calculated for the two or more actuators based on a target position from a current position of the working platform according to one of (i) an open-loop configuration, (ii) a first closed-loop configuration utilizing velocity of the working platform as a feedback signal, or (iii) a second closed-loop configuration utilizing velocity of the working platform as a first feedback signal and the position information of the working platform as a second feedback signal;

wherein by adjusting tension in the two or more cables, natural frequency of the working platform can be adjusted in response to frequency of vibration experienced by the working platform in order to maintain a frequency ratio (FR) of the vibration frequency to the natural frequency at or above a predetermined value, wherein each of (i) the open-loop, (ii) the first closed loop, and (iii) the second closed loop configurations initially calculates a target pose vector of the working platform, and wherein the target pose vector is calculated based on $$l_1 = [l_{11} \ l_{12} \ \ldots \ l_{1n}]^T, \ l_s = [l_{s1} \ l_{s2} \ \ldots \ l_{sn}]^T,$$
$$l_e = [l_{e1} \ l_{e2} \ \ldots \ l_{en}]^T \text{ whereby}$$

$l_{1i}$ represents a length of each of the two or more cables and which includes $l_{si}$ which represents an inelastic portion and $l_{ei}$ which represents an elastic portion, $l_s^* = l_1^* - l_e$ where * denotes a target representation of the working platform, and is calculated based on $$M\ddot{x} + C\dot{x} + G = -J^T \tau$$

where M represents inertia matrix,
C represents Coriolis matrix,
G represents gravity matrix,
J represents Jacobian matrix, and
$\tau$ represents tension in the two or more cables, which yields n−1 equations for n cable tension unknowns which can be solved for a tension solution, and where tension and the change in $l_e$ are related based on $\tau = EA \cdot \text{diag}^{-1}(l_e)\Delta l_e$, where E represents Young's modulus of elasticity of the elastic portion and A represents cross sectional area of each of the two or more cables, and $\Delta l_e$ represents extended length of each of the two or more cables and is defined by $l_1 - l_s - l_e$ and $$\text{diag}^{-1}(l_e) = \begin{bmatrix} \frac{1}{l_{e1}} & 0 & 0 & 0 \\ 0 & \frac{1}{l_{e2}} & 0 & 0 \\ 0 & 0 & \ddots & 0 \\ 0 & 0 & 0 & \frac{1}{l_{en}} \end{bmatrix}.$$

10. The system of claim 9, further comprising one or more sensors configured to provide vibration information of the working platform.

11. The system of claim 9, the first controller configured to:

receive signals from the one or more sensors configured to measure vibration frequency of the working platform;

determine the cable tension based on a previous calculated value of the natural frequency of the working platform and the FR;

provide signals for the two or more actuators to adjust the corresponding cables;

calculate a new natural frequency of the working platform; and compare the FR to a predetermined value.

12. The drive system of claim 9, wherein the n−1 equations and n unknowns can be solved for each tension of the two or more cables based on minimum norm least-squares.

13. The drive system of claim 12, wherein the Jacobian matrix is defined by $$J = -\begin{bmatrix} u_1 & u_2 & \ldots & u_n \\ b_1 \times u_1 & b_2 \times u_2 & \ldots & b_n \times u_n \end{bmatrix}^T,$$

where $u_i$ represents a unit vector along the $i^{th}$ cable and $b_i$ represents the position vector of the connection point through which the $i^{th}$ cable is connected to the working platform.

14. The drive system of claim 9, further comprising one or more velocity sensors configured to provide velocity information of the working platform and one or more position sensors configured to provide position information of the working platform.

* * * * *